Sept. 29, 1942.  W. P. HERMAN  2,297,622
MANUFACTURE OF RUBBER THREAD
Filed Nov. 4, 1938  2 Sheets-Sheet 1

INVENTOR
William P. Herman
BY Nathaniel Frucht
ATTORNEY

Sept. 29, 1942.                W. P. HERMAN                2,297,622
                        MANUFACTURE OF RUBBER THREAD
                            Filed Nov. 4, 1938            2 Sheets-Sheet 2
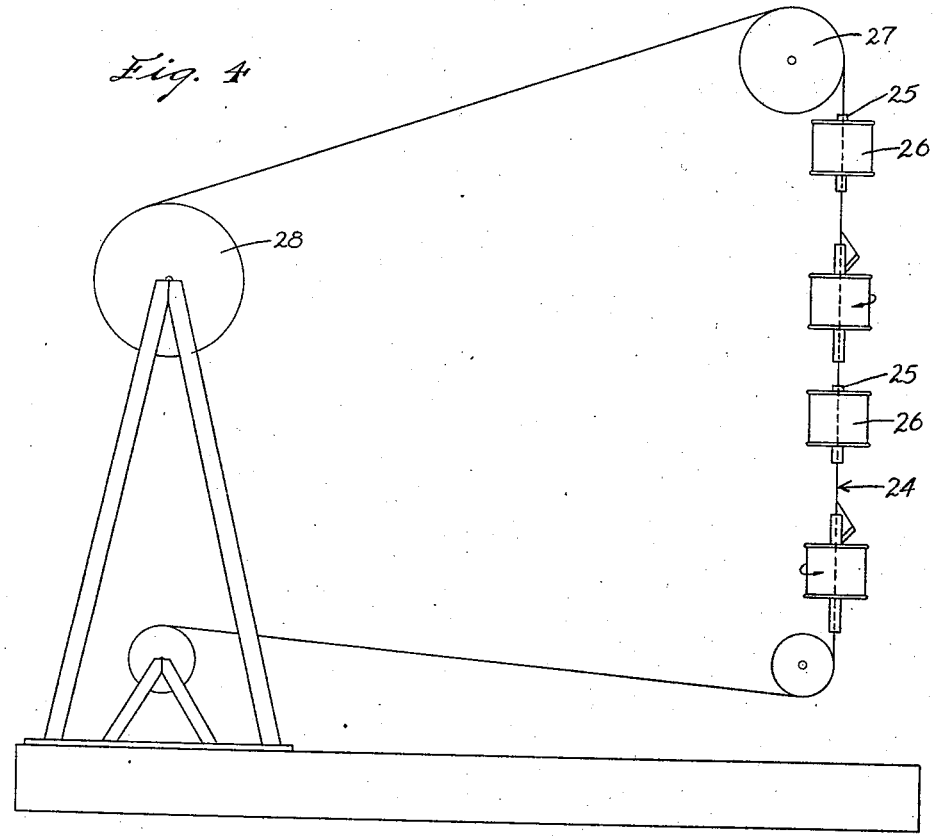
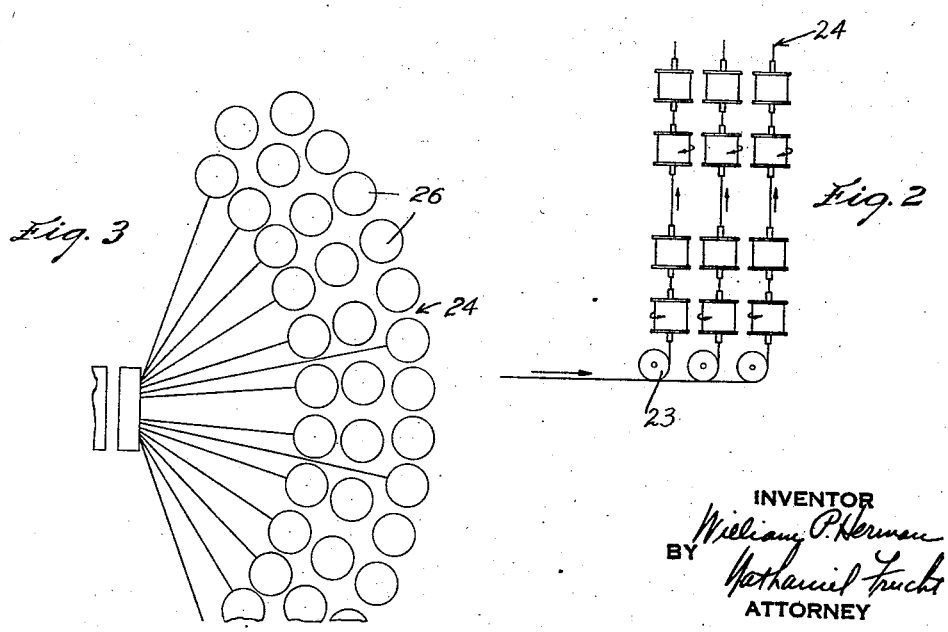
INVENTOR
William P. Herman
BY
Nathaniel Frucht
ATTORNEY Patented Sept. 29, 1942

2,297,622

UNITED STATES PATENT OFFICE 2,297,622

MANUFACTURE OF RUBBER THREAD

William P. Herman, Providence, R. I.

Application November 4, 1938, Serial No. 238,776

5 Claims. (Cl. 18—8)

My present invention relates to the manufacture of rubber thread, and has particular reference to a novel method and a novel apparatus for continuous producing of plain or covered rubber thread from crude rubber.

It is the principal object of my invention to provide a method and an apparatus for obtaining the desired final product in a single continuous operation, whereby cost of manufacture is greatly reduced.

It is a further object of my invention to provide a manufacturing procedure which may be readily changed or modified to obtain different desired thread constructions.

Another object of my invention is to provide a machine layout for the continuous manufacture of finished rubber thread so as to minimize the cost of operation and to minimize the space required for manufacture.

With the above and other objects and advantageous features in view, my invention consists of a novel arrangement of parts more fully disclosed in the detailed description following, in conjunction with the accompanying drawings, and more specifically defined in the claims appended thereto.

In the drawings:

Fig. 2 is a modified arrangement, utilizing the manufacturing apparatus of Fig. 1, for producing covered rubber strands;

Fig. 3 is a top plan view of Fig. 2, showing one form of arrangement of the winding spools; and Fig. 4 is a side elevation of a preferred arrangement for covering the rubber threads.

Figure 1:
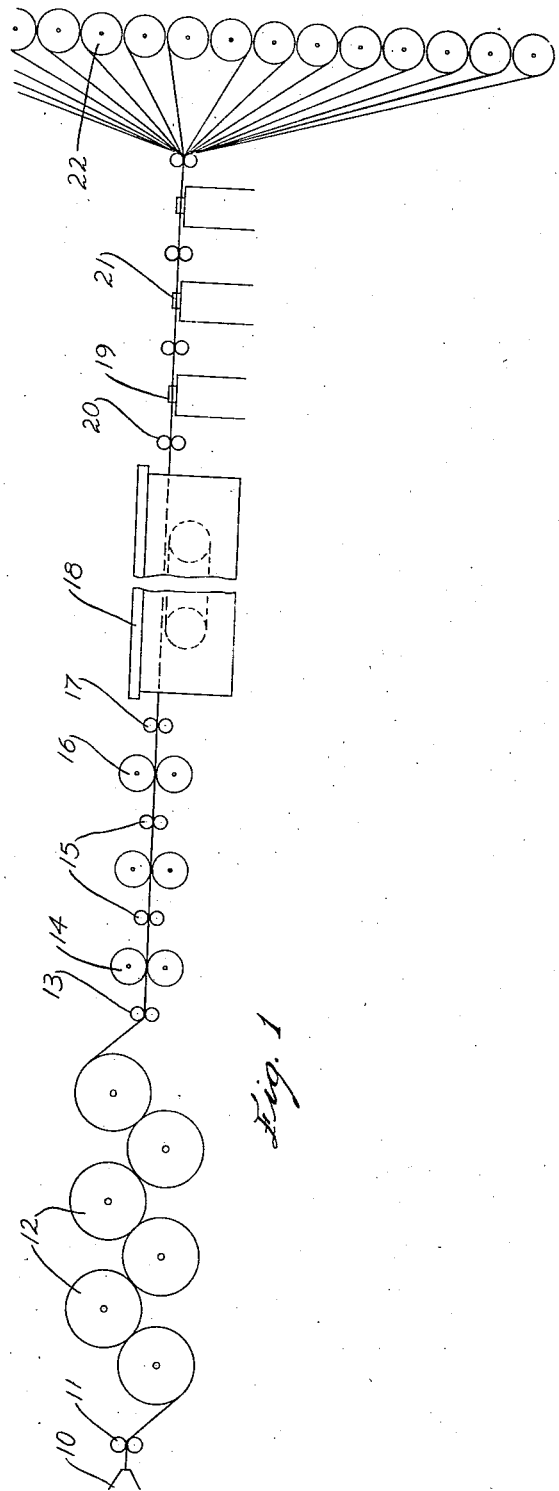
Fig. 1 is a side elevation of the novel arrangement of machinery suitable for producing strands of plain rubber.

Referring to the drawings, and particularly Fig. 1, an illustrative apparatus is disclosed for producing a plurality of plain rubber threads of any desired width. The crude rubber, having been masticated and conditioned for extrusion, is extruded from an extruder of standard type, preferably in the form of a thin sheet of the desired thickness of the finished product, and of a convenient working width. For obtaining rubber thread $50/1000$ of an inch wide, a suitable arrangement extrudes a sheet of rubber $50/1000$ of an inch thick and two inches wide, the extruded sheets passing through guide rolls 11 to a plurality of flanged calender rolls 12 which smooth and even the rubber to the proper required thickness and width. Any number of calender rolls may be used, it having been found advisable for a sheet of extruded stock of the type described to use six calender rolls. This smoothed, even rubber stock then passes through a second set of guide rolls 13, and then through a plurality of scoring rolls 14, each set having guide rolls 15 therebetween. the scoring rolls preferably scoring the stock about 95% so that it may be easily separated after it has been multiplied. The width of the stock is gauged so as to have an even number of cuts to the inch, the scoring process being preferably first carried out with nine disks, then with ten disks spaced intermediate the first set, and then through a final set of twenty scoring rolls 16 so as to produce forty joined threads, the scored threads then passing through a final set of guide rolls 17 and into a vulcanizing tank 18.

When using a 2" width strip of stock, a strip passing into the vulcanizing tank thus is scored to provide forty threads across the face of the sheet of rubber, ready for separating after the rubber has been vulcanized. The preferred construction of vulcanizing tank utilizes a vulcanizing bed mounted on power driven rollers to automatically convey the stock forwardly and to prevent sagging while vulcanization is taking place, the vulcanization itself being accomplished either by dry heat, chemicals, or by any other preferred means. When the strip leaves the vulcanizing tank 18, it passes through a separating apparatus generally designated as 19, having a plurality of guide rolls 20 and separators 21, which follow the arrangement of the scoring rolls previously described, the separator first starting off with nine divisions, then repeating the ten divisions, and then with twenty divisions so as to finally completely separate the vulcanized strips of stock into forty threads, the threads being automatically taken up by a winding machine 22, diagrammatically illustrated in Fig. 1; all the moving parts of the apparatus are synchronized so that the extruding, calendering, scoring, vulcanizing, separating, and winding are continuous to thus provide a continuous operation from the original extruding to the final product wound on spools.

The above described product produces a plurality of spooled rubber threads, the rubber threads being plain and not covered. If it be desired to cover the rubber thread with yarn, silk, or other materials, this is readily accomplished by using yarn servers such as shown in Figs. 2 and 3, the rubber threads being passed through the separator and guided by suitable guide pulleys 23 and then through the winding apparatus 24 to obtain a clockwise and an anticlockwise layer so as to give a double covering for the rubber thread. Although any suitable winding mechanism may be used, which is synchronized with the thread-forming apparatus, it is preferred to use an arrangement such as shown in Fig. 4, which utilizes a central tube arrangement 25 having a plurality of tubes of yarn 26 mounted thereon, always in position to drop into position and replace a completely used spool of yarn. The spools for this arrangement may be of paper, so as to be readily cut for removing, or may be of split resilient stock to permit removal.

Preferably, suitable tension means are provided as required so as to tension the yarn during the covering operation, and in its movement over the usual guide pulleys 27 to the pick up reels 28. Using the above described method, the provision of continually rotating calenders, a continuous vulcanizing tank and a continuous system of scoring and separating the rubber threads permits the covering of a plurality of formed rubber threads and the obtaining of a finished product, suitably covered and spooled, in one continuous operation.

The preferred speed of extrusion is from 40 to 80 ft. per minute, but this speed can be increased greatly, as for example to 400 ft. per minute, as the speed of separating and the speed of covering can be regulated in accordance with the speed of extrusion. The size of the vulcanizing tanks is dependent on the speed of extrusion, as sufficient time within the vulcanizing tank must be allowed to obtain the desired vulcanization.

It is thus evident that the invention comprises a novel system and a novel apparatus for continuously producing either plain or covered rubber thread from raw stock, the raw stock being preferably extruded and then scored and vulcanized, and then separated and wound upon spools or passed through winders to receive yarn, silk, or other covering before being finally wound on reels. The saving in manufacturing cost is large, as a single set of continually operating machines are used, which require little attention, and which operate in unison to complete the entire manufacturing procedure. The arrangement above described is very suitable for multiple unit use, as a battery of machines may be provided at low cost, any breakdown being quickly corrected without stoppage of the remaining machines.

I claim:

1. In an apparatus for continuously producing rubber thread from an endless length of unvulcanized rubber of a predetermined width and thickness, the combination of means for continuously scoring said length along successively narrower lines, means for continuously vulcanizing said scored length, and means for continuously separating said vulcanized scored length along the scored lines in successively narrower separations until a plurality of rubber threads are obtained.

2. In an apparatus for continuously producing rubber thread from an endless length of unvulcanized rubber of a predetermined width and thickness, the combination of means for continuously scoring said length along successively narrower lines, means for continuously vulcanizing said scored length, and means for continuously separating said vulcanized scored length along the scored lines in successively narrower separations until a plurality of rubber threads are obtained, said scoring means comprising a plurality of sets of spaced scoring knives arranged in staggered relationship, each succeeding set having more knives with less spacing than the preceding set.

3. In an apparatus for continuously producing rubber thread from an endless length of unvulcanized rubber of a predetermined width and thickness, the combination of means for continuously scoring said length along successively narrower lines, means for continuously vulcanizing said scored length, and means for continuously separating said vulcanized scored length along the scored lines in successively narrower separations until a plurality of rubber threads are obtained, said separating means comprising a plurality of sets of spaced separators arranged in staggered relationship, each succeeding set having more separators with less spacing than the preceding set.

4. In an apparatus for continuously producing rubber thread from an endless length of unvulcanized rubber of a predetermined width and thickness, the combination of means for continuously scoring said length along successively narrower lines, means for continuously vulcanizing said scored length, and means for continuously separating said vulcanized scored length along the scored lines in successively narrower separations until a plurality of rubber threads are obtained, said scoring means comprising a plurality of sets of spaced scoring knives arranged in staggered relationship, each succeeding set having more knives with less spacing than the preceding set, said separating means comprising a plurality of sets of spaced separators arranged in staggered relationship, each succeeding set having more separators with less spacing than the preceding set.

5. In a method of continuously producing rubber thread from an endless length of unvulcanized rubber of predetermined width and thickness, the steps of continuously scoring said length along successively narrowerly spaced lines, continuously vulcanizing said scored length, and continuously separating said length along successively narrowerly spaced scored lines until said scored vulcanized length has been separated into a plurality of rubber threads along the scored lines.

WILLIAM P. HERMAN.